US011854254B2

(12) United States Patent
Henley et al.

(10) Patent No.: US 11,854,254 B2
(45) Date of Patent: Dec. 26, 2023

(54) SYSTEMS AND METHODS FOR INITIATING ADJUSTMENT OF AN OPERATION ASSOCIATED WITH AN UNDERWATER DRILLING SYSTEM

(71) Applicant: SHELL USA, INC., Houston, TX (US)

(72) Inventors: John Andrew Henley, Houston, TX (US); Yu Liu, Houston, TX (US)

(73) Assignee: SHELL USA, INC., Houston, TX (US)

(*) Notice: Subject to any disclaimer, the term of this patent is extended or adjusted under 35 U.S.C. 154(b) by 0 days.

(21) Appl. No.: 17/760,620

(22) PCT Filed: Feb. 10, 2020

(86) PCT No.: PCT/US2020/017487
§ 371 (c)(1),
(2) Date: Mar. 15, 2022

(87) PCT Pub. No.: WO2021/076175
PCT Pub. Date: Apr. 22, 2021

(65) Prior Publication Data
US 2022/0270361 A1   Aug. 25, 2022

Related U.S. Application Data

(60) Provisional application No. 62/916,814, filed on Oct. 18, 2019.

(51) Int. Cl.
*G06V 20/05* (2022.01)
*G06T 7/136* (2017.01)
(Continued)

(52) U.S. Cl.
CPC .............. *G06V 20/05* (2022.01); *E21B 44/00* (2013.01); *E21B 47/001* (2020.05);
(Continued)

(58) Field of Classification Search
CPC ....... G06V 20/05; E21B 44/00; E21B 47/001; E21B 47/002; E21B 41/0007;
(Continued)

(56) References Cited

U.S. PATENT DOCUMENTS 8,136,597 B2    3/2012   Calderoni et al.
8,767,063 B1*   7/2014   Berger, III ............ E21B 47/002
                                                      348/85
(Continued)

OTHER PUBLICATIONS

International Search Report and Written Opinion received for PCT Patent Application No. PCT/US2020/017487, dated Jun. 8, 2020, 11 pages.
(Continued)

*Primary Examiner* — James G Sayre
(74) *Attorney, Agent, or Firm* — SHELL USA, INC.

(57) ABSTRACT

This disclosure is directed to initiating adjustment of an operation associated with an underwater drilling system, which may include receiving at least one underwater image; identifying the reference object in the at least one underwater image, wherein a position of the reference object is fixed relative to an underwater borehole or an underwater cloud; determining a first parameter associated with the reference object; identifying the underwater cloud in the at least one underwater image; determining a second parameter associated with the underwater cloud; adjusting the second parameter associated with the underwater cloud based on the first parameter associated with the reference object; and initiating an adjustment of the operation associated with the underwater drilling system based on the adjusted second parameter associated with the underwater cloud.

20 Claims, 3 Drawing Sheets

(51) Int. Cl.
  *E21B 47/001* (2012.01)
  *E21B 47/002* (2012.01)
  *E21B 44/00* (2006.01)
  *G06T 5/00* (2006.01)

(52) U.S. Cl.
  CPC ............ *E21B 47/002* (2020.05); *G06T 5/007* (2013.01); *G06T 7/136* (2017.01); *G06T 2207/20021* (2013.01); *G06T 2207/20132* (2013.01)

(58) Field of Classification Search
  CPC ......... E21B 44/02; G06T 5/007; G06T 7/136; G06T 2207/20021; G06T 2207/20132; G06T 7/11; G06T 7/194
  See application file for complete search history.

(56) References Cited

U.S. PATENT DOCUMENTS

| | | | |
|---|---|---|---|
| 10,163,213 B2 | 12/2018 | Boyle et al. | |
| 2020/0190967 A1* | 6/2020 | Gooneratne | G01N 21/8851 |
| 2021/0217144 A1* | 7/2021 | Snellgrove | H04N 1/60 |
| 2021/0335020 A1* | 10/2021 | Lastra | G06F 16/54 |
| 2022/0003105 A1* | 1/2022 | Verissimo | G01M 3/08 |
| 2022/0364947 A1* | 11/2022 | Speck | G01M 3/04 |

OTHER PUBLICATIONS

Henley, "Machine Learning Applications for Riserless Drilling", IADC Advanced Rig Technology 2019 Conference & Exhibition, Apr. 15, 2019, (see abstract on p. 3).

\* cited by examiner

SYSTEMS AND METHODS FOR INITIATING ADJUSTMENT OF AN OPERATION ASSOCIATED WITH AN UNDERWATER DRILLING SYSTEM

CROSS REFERENCE TO RELATED APPLICATIONS

This is a National stage application of International application No PCT/US2020/017487, filed Feb. 10, 2020, which claims priority of U.S. application No. 62/916,814, filed 18 Oct. 2019 which is incorporated herein by reference in its entirety.

TECHNICAL FIELD

Generally, the present disclosure relates to methods and computing systems for initiating adjustment of an operation with an underwater drilling system and/or for outputting one or more operation parameters associated with an underwater drilling system.

BACKGROUND

Underwater drilling operations require constant monitoring to ensure integrity of the output and equipment associated with the operations. Limitations to the existing monitoring include, among others: (1) subjective description and documentation that often rely on 24/7 human monitoring; (2) continuous trending not being captured and not being quantified; and (3) time-lag in responding to abnormal events.

SUMMARY

In a first aspect, there is provided a method of initiating adjustment of an operation associated with an underwater drilling system may comprise receiving, using one or more computing device processors, at least one underwater image; identifying, using the one or more computing device processors, the reference object in the at least one underwater image, wherein a position of the reference object is fixed relative to an underwater borehole or an underwater cloud, wherein execution of a drilling operation associated with the underwater borehole causes formation of the underwater cloud; determining, using the one or more computing device processors, a first parameter associated with the reference object; identifying, using the one or more computing device processors, the underwater cloud in the at least one underwater image; determining, using the one or more computing device processors, a second parameter associated with the underwater cloud; adjusting, using the one or more computing device processors, the second parameter associated with the underwater cloud based on the first parameter associated with the reference object; and initiating, using one or more computing device processors, an adjustment of the operation associated with the underwater drilling system based on the adjusted second parameter associated with the underwater cloud.

In a second aspect, there is provided a computing system for outputting one or more operation parameters associated with an underwater drilling system, the computing system comprising: at least one memory comprising instructions; and one or more computing device processors for executing the instructions, wherein the instructions cause the one or more computing device processors to perform operations of: receiving at least one underwater image; identifying, using the one or more computing device processors, the reference object in the at least one underwater image, wherein a position of the reference object is fixed relative to an underwater borehole or an underwater cloud, wherein execution of a drilling operation associated with the underwater borehole causes formation of the underwater cloud; determining a first parameter associated with the reference object; identifying the underwater cloud in the at least one underwater image; determining a second parameter associated with the underwater cloud; adjusting the second parameter associated with the underwater cloud based on the first parameter associated with the reference object; determining the one or more operation parameters associated with the underwater drilling system based on the adjusted second parameter associated with the underwater cloud; and outputting the one or more operation parameters.

There is further provided a non-transitory computer-readable medium for initiating an adjustment of the operation associated with the underwater drilling system comprises code configured for: receiving at least one underwater image comprising an underwater environment associated with the underwater borehole or the underwater cloud; identifying, using the one or more computing device processors, the reference object in the at least one underwater image, wherein a position of the reference object is fixed relative to an underwater borehole or an underwater cloud, wherein execution of a drilling operation associated with the underwater borehole causes formation of the underwater cloud; determining a first parameter associated with the reference object; identifying the underwater cloud in the at least one underwater image; determining a second parameter associated with the underwater cloud; adjusting the second parameter associated with the underwater cloud based on the first parameter associated with the reference object; and initiating an adjustment of the operation associated with the underwater drilling system based on the adjusted second parameter associated with the underwater cloud.

DETAILED DESCRIPTION

Figure 1A:
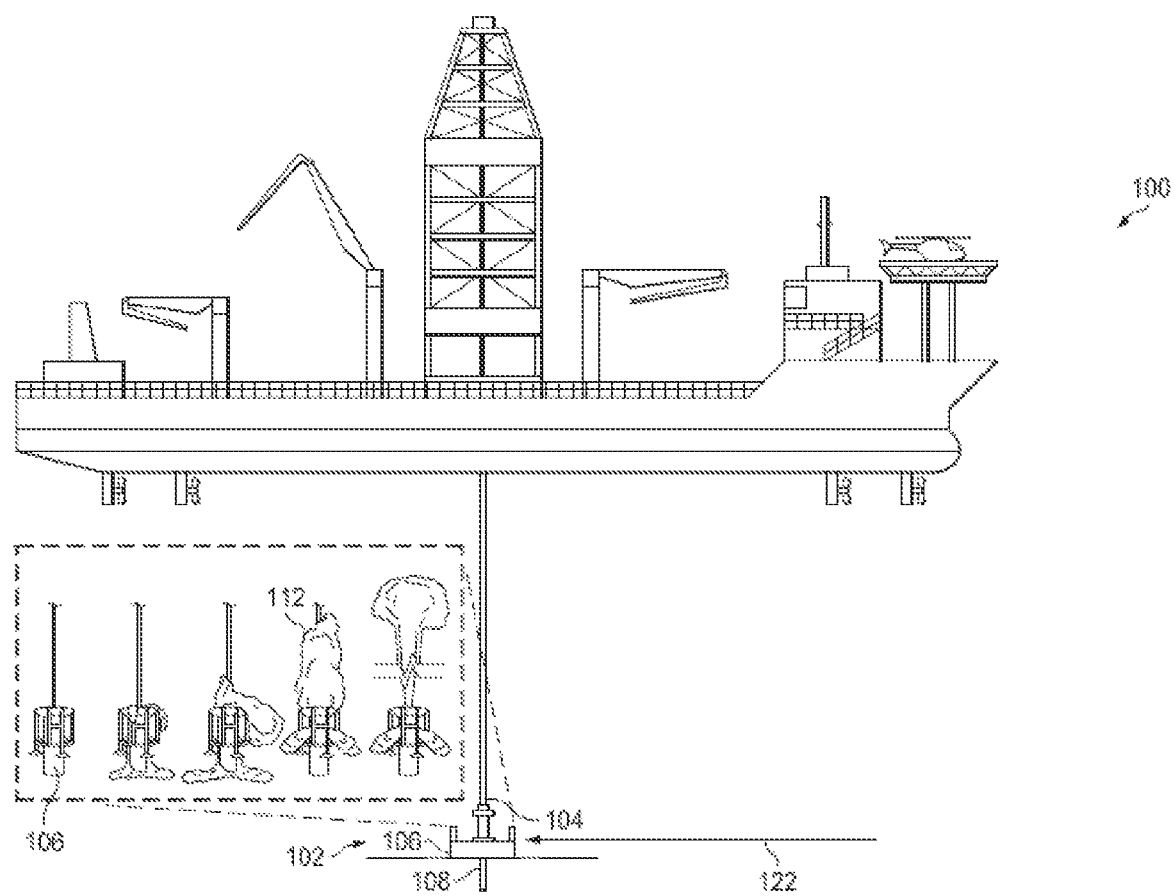
FIG. 1A and FIG. 1B show a schematic block diagram of a system for initiating adjustment of an operation associated with an underwater drilling system.

In the following detailed description, numerous specific details are set forth by way of examples in order to provide a thorough understanding of the relevant teachings. However, the present teachings may be practiced with or without such specific details. In other instances, well-known methods, procedures, components, and/or circuitry have been described at a relatively high level, without detail, in order to avoid unnecessarily obscuring aspects of the present teachings. The various technologies described in this specification generally relate to underwater drilling systems, which may be used to pump oil and gas and other fluids or gas from an oil and gas reservoir. Specifically, this present disclosure relates to monitoring, executing, and adjusting operations associated with an underwater drilling system. It is understood that any features of any embodiment described herein may be incorporated into any other embodiment described herein. Features of different embodiments can be combined to form new embodiments. Further, any one or more of the steps, operations, etc., described herein may be performed in the order described or in any order. Any one or more of the steps, operations, etc., described herein may be removed and additional steps may be added. Although the present disclosure is related to underwater drilling systems, it should also be understood that any one or more of the methods, systems, operations, etc., described herein may be associated with other drilling systems, e.g., above-water drilling systems, land-based drilling systems, etc., and that the term "underwater," as used herein, is meant to be descriptive and not limiting. The term "underwater cloud," as used herein, may refer to any dynamic object or event, e.g., any solid, liquid, or gaseous event or object, which may be associated with an underwater drilling system. An underwater cloud may be expelled from an underwater borehole. An underwater cloud may form symmetrically about a borehole, asymmetrically about a borehole, or away from a borehole.

A proposed method of initiating adjustment of an operation associated with an underwater drilling system may comprise receiving at least one underwater image, identifying the reference object in the at least one underwater image, determining a first parameter associated with the reference object, identifying the underwater cloud in the at least one underwater image, determining a second parameter associated with the underwater cloud, adjusting the second parameter associated with the underwater cloud based on at least one of the first parameter associated with the reference object and the position of the reference object relative to the underwater borehole or the underwater cloud, and initiating an adjustment of the operation associated with the underwater drilling system based on the adjusted second parameter associated with the underwater cloud. The method uses one or more computing device processors.

The underwater cloud may be identified in the at least one underwater image using the one or more computing device processors. Said identifying may further comprise performing a thresholding operation on the underwater image. In some cases, preprocessing of the underwater image may be necessary or desired before performing said thresholding operation. In some cases preprocessing may be required to facilitate the execution of the thresholding operation. Preprocessing may include one or more of cropping the underwater image and applying contrast enhancement to the underwater image. Preprocessing may also include transforming the underwater image into a second underwater image, whereby subsequent steps are performed on the second underwater image instead of the underwater image itself. Such transforming may include transforming the image format or transforming to grey-scale image format.

Said performing of said thresholding operation on the underwater image may further comprise separating the underwater image into a first part of the underwater image and a second part of the underwater image, and wherein the first part of the underwater image comprises the underwater cloud. Separating the underwater image may comprise classifying, based on a threshold, the first part of the underwater image and the second part of the underwater image.

The method may further comprise determining one or more operation parameters associated with the underwater drilling system based on the adjusted second parameter associated with the underwater cloud. The one or more operation parameters may comprise one or more of flow rate, standpipe pressure, mud weight, surface-measured pipe movement, and surface-measured pipe position, and downhole annulus pressure.

The method may further comprise generating a log of the one or more operation parameters as a function of time.

The method may further comprise synchronizing the one or more operation parameters with one or more additional operation parameters to generate a synchronized log of operation parameters. The one or more additional operation parameters may comprise one or more of flow rate, standpipe pressure, mud weight, surface-measured pipe movement, and surface-measured pipe position, and downhole annulus pressure.

The adjusted second parameter may suitably provide an indication of at least one of a size, a length, a width, a height, a volume, or a rate of change of at least one of the size, the length, the width, the height, or the volume of the underwater cloud.

The one or more computing device processors may be located in one or more computing systems comprised in at least one of an image-capturing system, a remote operating vehicle, the underwater drilling system, an underwater computing system, the reference object, the underwater borehole, or a remote computing system located remotely from the image-capturing system, the remote operating vehicle, the underwater drilling system, the underwater computing system, the reference object, or the underwater borehole.

The adjusting of the second parameter may comprise or consist of scaling the second parameter.

The image is suitably captured by an image-capturing system.

The reference object may comprise one or more of a drill pipe, a wellhead, and a cylinder base.

A non-transitory computer-readable medium may be provided, which comprises code configured for initiating the adjustment of the operation associated with the underwater drilling system as described above.

The code may further be configured to enhance the underwater image.

The code may further be configured for adding or editing visual information associated with a foreground or a background of the underwater image.

There may further be provided a computing system for receiving at least one underwater image and outputting one or more operation parameters associated with an underwater drilling system, the computing system comprising: at least one memory comprising instructions; and one or more computing device processors for executing the instructions, wherein the instructions cause the one or more computing device processors to perform operations of determining the one or more operation parameters associated with the underwater drilling system based on the adjusted second parameter associated with the underwater cloud; and outputting the one or more operation parameters.

The instructions may further cause the one or more computing device processors to perform enhancing or augmenting of the underwater image.

Enhancing or augmenting the underwater image may further comprise enhancing or augmenting one or more of a foreground of the underwater image and a background of the underwater image. The foreground of the underwater image comprises the underwater cloud.

The one or more operation parameters may comprise one or more of flow rate, standpipe pressure, mud weight, surface-measured pipe movement, surface-measured pipe position, and downhole annulus pressure.

The instructions may further cause the one or more computing device processors to perform synchronizing of the one or more operation parameters with one or more additional operation parameters associated with the underwater system to generate a synchronized log of operation parameters.

The first parameter or the second parameter may comprise at least one of a height, a width, a depth, an orientation, or the position of the reference object or the underwater cloud, respectively.

The one or more computing device processors are comprised in the computing system or located in one or more external computing systems.

Figure 1B:
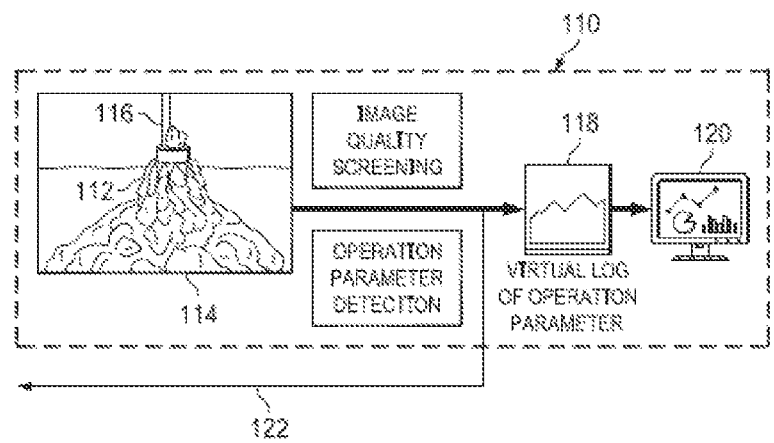

FIG. 1A illustrates a method 100 of initiating adjustment of an operation 122 associated with an underwater drilling system. As illustrated, an underwater drilling system 102 may comprise a drill pipe 104, a guide base 106, a borehole 108, and an underwater cloud 112. FIG. 1B illustrates one or more computing device processors 110 that may facilitate the methods disclosed here. The one or more computing device processors 110 may receive at least one underwater image 114. An underwater image 114 may comprise an image 114 of a reference object 116 and an underwater cloud 112. One or more computing device processors 110 may analyze the image 114 for quality and detect characteristics of an operation parameter based on information both intrinsic and extrinsic to the image 114. Results of an image analysis may be used to determine if initiating adjustment of an operation 122 is appropriate. Initiating adjustment of an operation 122 may comprise adjustment of any operation or component associated with an underwater drilling system, e.g., drilling, flow adjustments, inputs, outputs, materials, etc. Results of an image analysis may be compiled to generate a virtual log 118 of an operation parameter and a virtual log 118 may be combined with other data to generate a synchronized log 120 of operation parameters.

Although the one or more computing device processors 110 are illustrated in FIG. 1 as a single, stand-alone device, it should be appreciated that the computing functions described in this disclosure may be performed by one or multiple processors and that the terms system, apparatus, device, etc. may be used interchangeably in this specification. The one or more computing device processors 110 may be a component in a computing system which may comprise one or more other components such as a memory, input/output center, communications center, and associated databases. Further, any servers, processors, processing instances, communications centers, memory or computing data storage areas, databases, etc., may be provided by either stand-alone computing machines or through cloud implementation or by a hybrid/enterprise/cloud architecture. The one or more computing device processors may be located in one or more computing systems comprised in at least one of an image-capturing system, a remote operating vehicle, the underwater drilling system, an underwater computing system, a reference object, a underwater borehole, or a remote computing system located remotely from an image-capturing system, a remote operating vehicle, an underwater drilling system, an underwater computing system, a reference object, or an underwater borehole.

Figure 2:
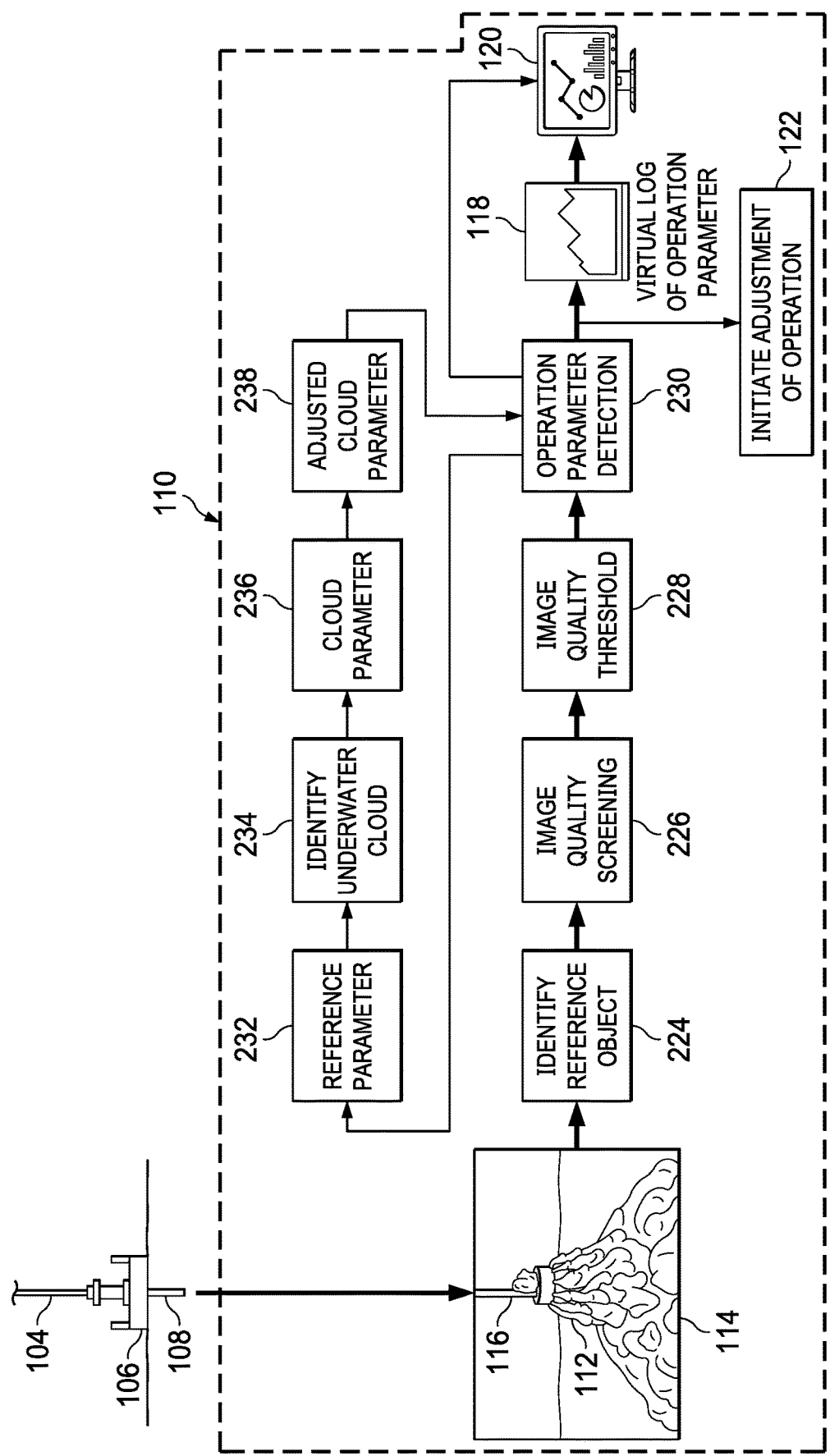
FIG. 2 shows a flowchart that schematically represents a method of initiating adjustment of an operation associated with an underwater drilling system.

Referring now to FIG. 2, an underwater drilling system may comprise an underwater cloud 112 which may be caused by any operation associated with an underwater drilling system. A suitable reference object 116 may comprise any object, e.g., a drill pipe, a wellhead, a cylinder base, etc., that is in close enough proximity to the guide base 106, and therefore the cloud 112, that the reference object 116 may be simultaneously captured in an image 114 of the guide base 106 or the cloud 112. The position of the reference object 116 may be fixed relative to an underwater borehole 108 or an underwater cloud 112. As used herein, "fixed" may mean that that a distance or an orientation of the object 116 relative to the underwater borehole 108 or the underwater cloud 112 may remain substantially constant or static over a period of time. As illustrated in FIG. 2, the reference object 116 is the drill pipe 104. The reference object 116 may be associated with one or more parameters, which may include, without limitation, height, width, depth, orientation, and position. A parameter may be a value relative to a drill pipe 104, a guide base 106, a borehole 108, an underwater cloud 112, or other component of an underwater drilling system 102, e.g., distance from an underwater cloud 112, orientation in relation to an underwater cloud 112. The parameter associated with the reference object 112 may be the position of the reference object 116 to an underwater borehole 108 or an underwater cloud 112.

A method of initiating adjustment of an operation associated with an underwater drilling system may comprise receiving at least one underwater image 114 at one or more computing device processors 110. An underwater image 114 may comprise an image captured by an image-capturing system, which may comprise any one or a combination of optical and/or non-optical imaging devices, e.g. multi-beam sonar imaging devices, thermal imaging devices, sonic imaging devices, ultrasonic imaging devices, cameras, Echoscope, ARIS, etc. An image-capturing system may comprise one or multiple imaging devices. For example, an image-capturing system may comprise multiple imaging devices which may provide multiple viewpoints of the underwater drilling system or any one or more of its components. An underwater image 114 may comprise a digital and/or video image. An image-capturing system may be located at a stationary point (e.g., a mounted frame, a component of the underwater drilling system, a fixed viewing point), be mobile (e.g., on a remotely operated vehicle (ROV)), or comprise a combination of stationary and mobile elements.

As illustrated in FIG. 2, an underwater image 114 may comprise an image of a reference object 116 and an underwater cloud 112. An underwater image 114 may be associated with other data, e.g., time stamp data, data about drilling parameters, data about rig state, etc. A method of initiating adjustment of an operation associated with an underwater drilling system may comprise identifying the reference object 224 in the at least one underwater image 114. A regional convolution neural network (RCNN) may be used to identify the reference object 224. The accuracy of identifying the reference object 224 may be used as an indirect factor to evaluate the desirable qualification of the image 226. For example, factors such as image source positioning and blurriness of the image 114 may be determined through the accuracy of identifying the reference object 224. Evaluating the desirable qualification of the image 226 may comprise detecting dynamic events which may affect the quality of the image 114. Dynamic events may be captured by evaluating the accuracy of identifying the reference object 226 across multiple images 114. For example, if the position of a reference object 116 in a first image is different than the position of a reference object 116 in a second image, it may indicate that the source of the image source has shifted or been affected by a dynamic event. A method of initiating adjustment of an operation associated with an underwater drilling system may comprise determining if an image quality threshold has been reached 228. Said determining if an image quality threshold has been reached 228 may comprise applying a weighted metric to one or more of the factors used in evaluating the desirable qualification of the image 226 to determine a confidence score of the quality of the image 114. For example, only images 114 with confidence scores above a threshold may be used for further analysis, e.g., operation parameter detection 230.

Operation parameter detection 230 may comprise determining a first parameter associated with the reference object 232, identifying the underwater cloud 234 in the at least one underwater image 114, determining a second parameter 236 associated with the underwater cloud 112, and adjusting the second parameter 238 associated with the underwater cloud 112 based on at least one of the first parameter associated with the reference object and the position of the reference object relative to the underwater borehole or the underwater cloud. Determining a first parameter associated with the reference object 232 may comprise determining one or more parameters associated with the reference object 116. Parameters may include, without limitation, height, width, depth, orientation, and position. A parameter may be a value relative to a drill pipe 104, a guide base 106, a borehole 108, an underwater cloud 112, or other component of an underwater drilling system 102, e.g., distance from the underwater cloud 112, orientation in relation to the underwater cloud 112. The parameter may be determined using an image 114 or information contained in the image 114. A first parameter, for example, may be a number of pixels comprising the reference object 116 in an image 114.

A method of initiating adjustment of an operation associated with an underwater drilling system may comprise identifying the underwater cloud 234 in the at least one underwater image. Said identifying of the underwater cloud 234 may comprise cropping an underwater image 114, applying a contrast enhancement method to the underwater image 114, transforming the underwater image 114 into a second image, and performing a thresholding operation on the underwater image 114. The underwater image 114 may be cropped to remove header and footer text. A contrast enhancement method may be applied to the image 114 in order to improve a contrast value associated with the image 114. The image 114 may be transformed into a second image, e.g., a grey-scale image, and a thresholding operation may be performed to separate the image 114 into a foreground and a background. The thresholding operation may comprise any one or more of a binary thresholding operation comprising a fixed cut-off and an adaptive thresholding operation comprising dynamic cut-offs. A thresholding operation may be used to separate the image 114 into a first part and a second part. The foreground of the image 114 and/or the first part of the image 114 may comprise the underwater cloud 112. The thresholding operation may be used to classify, based on a threshold value, the image 114 into said first part and said second part. The foreground of the image 114 and/or the first part of the image 114 may comprise the underwater cloud 112. These and other operations to the image 114 may be performed on the second image in cases where the image 114 had been transformed into the second image.

It should be appreciated that any of the elements described for identifying an underwater cloud, e.g., cropping the underwater image 114, applying contrast enhancement method to the underwater image 114, transforming the underwater image 114 into said second image, and performing a thresholding operation on the underwater image 114, may be used alone or in any combination, to perform other elements disclosed herein. For example, identifying a reference object 224 may comprise any one or more of cropping an underwater image 114, applying a contrast enhancement method to the underwater image 114, transforming the underwater image 114 into a second image, and performing a thresholding operation on the underwater image 114.

A method of initiating adjustment of an operation associated with an underwater drilling system may comprise determining a second parameter 236 associated with the underwater cloud. Determining said second parameter 236 associated with the underwater cloud may comprise determining one or more parameters associated with the underwater cloud 112. Parameters may include, without limitation, height, width, depth, orientation, and position. A parameter may be a value relative to a drill pipe 104, a guide base 106, a borehole 108, a reference object 116, or other component of an underwater drilling system 102, e.g., distance from a reference object 116, orientation in relation to a reference object 116. The parameter may be determined using an image 114 or information contained in the image 114. The second parameter may be one or more of a number of pixels comprising the underwater cloud 112 in an image 114, and a size of a foreground of an image 114 relative to a background of an image 114 or a cropped image 114.

A method of initiating adjustment of an operation associated with an underwater drilling system may comprise adjusting the second parameter 238 associated with the underwater cloud based on at least one of a first parameter associated with the reference object 116 and the position of the reference object 116 relative to the underwater borehole 108 or the underwater cloud 112. Adjusting the second parameter 238 may comprise using the second parameter to extrapolate information about an operation associated with an underwater drilling system. For example, information about an operation associated with an underwater drilling system may comprise any information about any operation associated with an underwater drilling system, e.g., flow severity, flow rate, standpipe pressure, mud weight, surface-measured pipe movement, surface-measured pipe position, downhole annulus pressure, relative size of the underwater cloud 112, absolute size of the underwater cloud 112, etc. Adjusting the second parameter 238 associated with the underwater cloud based on at least one of a first parameter associated with the reference object 116 and the position of the reference object 116 relative to the underwater borehole 108 or the underwater cloud 112 may comprise comparing the first parameter associated with the reference object 116, e.g., pixel width of the reference object 116 in the underwater image 114, to the second parameter associated with the underwater cloud 112, e.g., pixel width of the underwater cloud 112 in the underwater image 114, to determine an absolute size of the underwater cloud 112. The absolute size of the underwater cloud 112 may be any one or more of height, width, depth, volume, etc. Adjusting the second parameter 238 associated with the underwater cloud based on at least one of a first parameter associated with the reference object 116 and the position of the reference object 116 relative to the underwater borehole 108 or the underwater cloud 112 may comprise using the absolute size of the underwater cloud 112 to determine a parameter associated with an operation associated with an underwater drilling system, e.g., flow severity, flow rate, standpipe pressure, mud weight, surface-measured pipe movement, surface-measured pipe position, downhole annulus pressure, etc. The adjusted second parameter may be an indication of at least one of a size, a length, a width, a height, a volume, or a rate of change of at least one of the size, the length, the width, the height, or the volume of the underwater cloud. The rate of change may comprise a rate of increase. A rate of increase may be indicative of a kick, wherein a kick may comprise formation fluids, e.g., oil, natural gas, water, etc., flowing into the wellbore and up the annulus and/or inside the drill pipe. The rate of change may comprise a rate of decrease. A rate of decrease may be indicative of fluid loss into the formation.

The proposed method of initiating an adjustment of an operation associated with an underwater drilling system may comprise outputting the one or more operation parameters. The one or more operation parameters may be converted into a virtual log of operation parameters 118. For example, by indexing a result of an operation parameter detection 230, e.g., with a time stamp, operation parameters may be compiled across multiple images 114 and used to generate a virtual log of operation parameters 118 as a function of a variable, e.g., time, a first parameter, a second parameter, an image 114, etc. The virtual log of operation parameters 118 may comprise a virtual log of return flow severity as a function of underwater cloud 112 size. A virtual log of operation parameters 118 may be synchronized with one or more additional operation parameters, e.g., standpipe pressure, relative clump size, surface drilling parameters, flow rate, standpipe pressure, mud weight, surface-measured pipe movement, surface-measured pipe position, downhole annulus pressure, etc., to generate a synchronized log 120 of operation parameters. The synchronized log 120 of operation parameters may comprise one or more of virtual flow severity, relative clump size, flow rate, standpipe pressure, and annulus pressure. The synchronized log 120 of operation parameters may comprise individually synchronized operation parameters and may be generated independent of a virtual log of operation parameters 118, e.g., a virtual log of operation parameters 118 may not be generated at all.

A method of initiating adjustment of an operation associated with an underwater drilling system may comprise initiating an adjustment 122 of an operation associated with the underwater drilling system based on an adjusted second parameter associated with the underwater cloud 112. An adjustment of an operation parameter may be any one or more of a manual adjustment and an automatic adjustment. Such an automatic adjustment may comprise sending an adjustment instruction to an underwater drilling system. Initiation of an adjustment may be based on one or more of an adjusted second parameter associated with an underwater cloud 112, a first parameter, a virtual log 118 of operation parameters, and a synchronized log 120 of operation parameters. The adjusted second parameter may be measured against a threshold value for the adjusted second parameter, where an adjusted second parameter above or below the threshold value may trigger initiation of an adjustment 122 of an operation associated with an underwater drilling system. The threshold value may be one or more of a preset value, a predetermined value, a value based on a virtual log 118 of an operation parameter, and a value based on a synchronized log 120 of an operation parameter.

Figure 3:
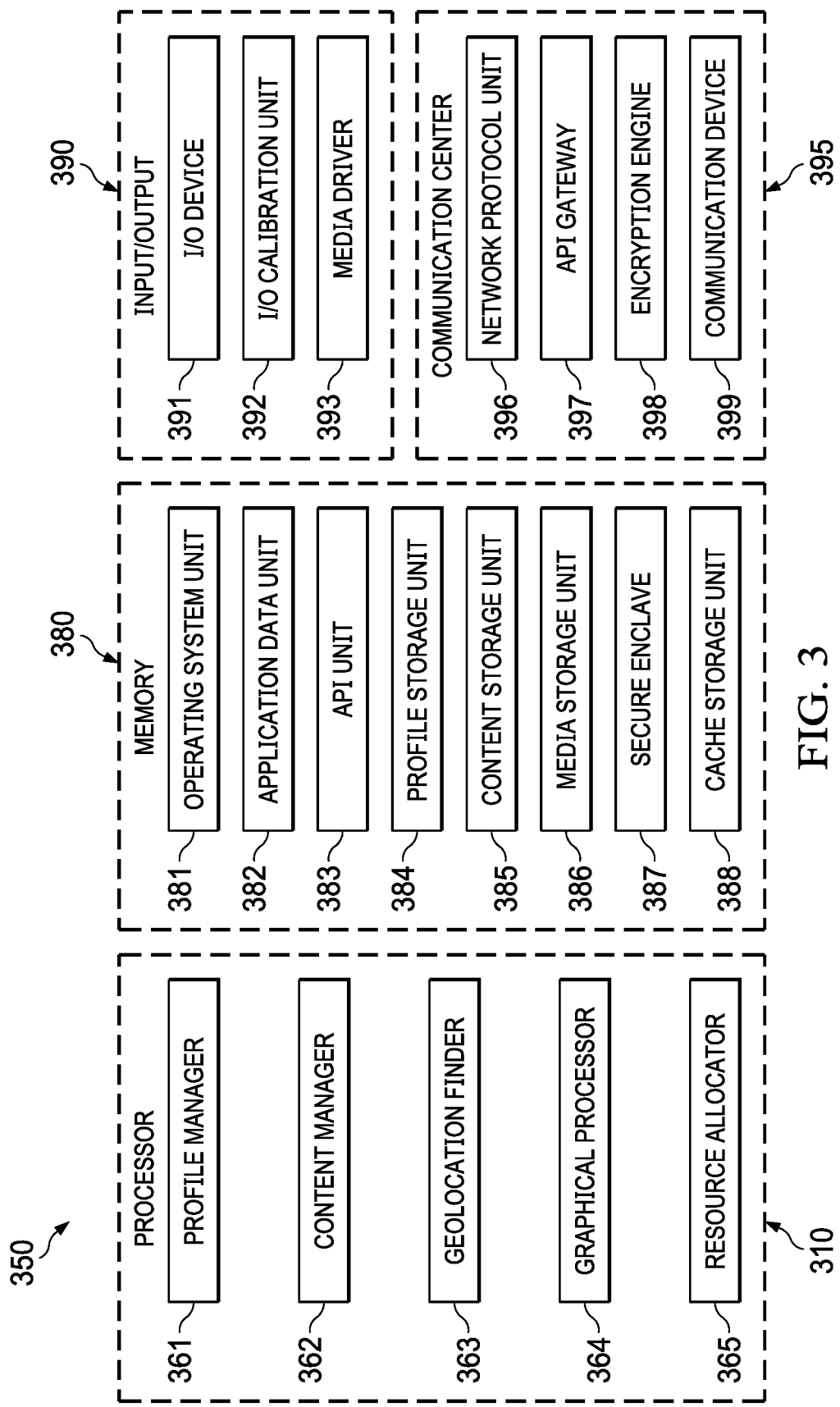
FIG. 3 shows a functional block diagram of a server for control and manipulation of images and data associated with disclosed systems and methods for initiating adjustment of an operation associated with an underwater drilling system.

Referring now to FIG. 3, an operating system for initiating adjustment of an operation associated with an underwater drilling system may comprise one or more servers 350, where the one or more servers 350 may comprise at least one memory 380 comprising server instructions, and at least one processing device 310 configured for executing the server instructions. The server instructions may cause the at least one processing device 310 to perform one or more functions of receiving at least one underwater image, identifying the reference object in the at least one underwater image, determining a first parameter associated with the reference object, identifying the underwater cloud in the at least one underwater image, determining a second parameter associated with the underwater cloud, adjusting the second parameter associated with the underwater cloud based on at least one of the first parameter associated with the reference object and the position of the reference object relative to the underwater borehole or the underwater cloud, and initiating an adjustment of the operation associated with the underwater drilling system based on the adjusted second parameter associated with the underwater cloud. A computing system or server associated with an underwater drilling system may be one or more local (e.g., in the underwater drilling system) or remote systems (e.g., over water), which may be located external or internal to the reference object, the cloud, the borehole, etc. Any one or more of the units or subsystems described below may be optional and may be present in the same computing system or in disparate, e.g., local or remote, computing systems which may be in network communication with each other.

The one or more servers 350 may comprise, among other elements, any combination of one or more processing units 310, at least one memory 380, one or more input/output (I/O) units 390, and one or more communications centers 395. Each of the processor 310, the memory 380, the I/O 310, and communication center 395 may include a plurality of respective units, subunits, and/or elements. Furthermore, each of the processor 310, the memory 380, the I/O 390, and the communication center 395 may be operatively or otherwise communicatively coupled with each other so as to facilitate the methods and techniques described herein.

The processor 310 may control any one or more of the memory 380, the I/O 390, the communication center 395, or any other unit which may include the server 350, as well as any included subunits, elements, components, devices, or functions performed by each or a combination of the memory 380, the I/O 390, the communication center 395 or any other unit which may include the server 350. Any of the elements or sub-elements of the server 350 presented here may also be included in a similar fashion in any of the other units, subunits, and devices included in the underwater drilling system of FIG. 1. Additionally, any actions described herein as being performed by a processor 310 may be taken by the processor 310 alone, or by the processor 310 in conjunction with one or more additional processors, units, subunits, elements, components, devices, and the like. Additionally, while only one processor 310 may be shown in the figures included here, multiple processors may be present or otherwise included in the server 350 or elsewhere in the system of FIG. 1. Thus, while instructions may be described as being executed by the processor 310 or the various subunits of the processor 361, 362, 363, 364, 365, the instructions may be executed simultaneously, serially, or otherwise by one or more multiple processors 310.

The processor 310 may be implemented as one or more computer processor (CPU) chips, graphical processor (GPU) chips, or some combination of CPU chips and GPU chips, and may include a hardware device capable of executing computer instructions. The processor 310 may execute any combination of instructions, codes, computer programs, and scripts. The instructions, codes, computer programs, and scripts may be received from, stored in, or received from and stored in any combination of the memory 380, the I/O 390, the communication center 395, subunits of the previously described elements, other devices, other computing environments.

The processor 310 may include, among other elements, subunits. Subunits may include any combination of a profile manager 361, a content manager 362, a geolocation finder 363, a graphical processor 364, and a resource allocator 365. Each of these subunits of the processor 310 may be communicatively or otherwise operably coupled with each other.

The profile manager 361 may facilitate any combination of generation, modification, analysis, transmission, and presentation of a user profile associated with a user. The profile manager 361 may also control or utilize an element of the I/O 390 to enable a user to associate an image with themselves or another person. The profile manager 361 may receive, process, analyze, organize, transform, or any combination of these, any received from the user or another computing element as to generate a user profile of a user.

The content manager 362 may facilitate any combination of generation, modification, analysis, transmission, and presentation of any media content associated with systems and methods of initiating adjustment of an operation associated with an underwater drilling system.

The geolocation finder 363, particularly in communication with geolocation information provided by available GPS subsystems which may be present elsewhere in an underwater drilling system, may facilitate any combination of detection, generation, modification, analysis, transmission, and presentation of location information. Location information may include any combination of global positioning system (GPS) coordinates, an internet protocol (IP) address, a media access control (MAC) address, geolocation information, an address, a port number, a zip code, a server number, a proxy name, a proxy number, device information, serial numbers, and the like. The geolocation finder 363 may include any one or a combination of various sensors, specifically-purposed hardware elements for enabling the geolocation finder 363 to acquire, measure, and transform location information.

The graphical processor (GPU) 364 may facilitate any combination of generation, modification, analysis, processing, transmission, and presentation of visual content. The GPU 364 may be configured to receive multiple images associated with an underwater drilling system and perform analysis on and/or modifications to the images. Such analysis may include comparison of current images to past images in any one or more of the manners described above. Further, the GPU 364 may be configured to facilitate adjustments to videos and images. The GPU 364 may also be configured to render visual content for presentation on a device and/or to analyze visual content for metadata associated with a component of an underwater drilling system or with a specific underwater drilling system. This visual content may include a real-time image of an underwater drilling system or any of its components. The GPU 364 may include multiple GPUs and may therefore be configured to perform and/or execute multiple processes in parallel.

The resource allocator 365 may facilitate any one or combination of the determination, monitoring, analysis, and allocation of resources throughout the server 350, the underwater drilling system, any component of the system, or other computing environments. For example, the resource allocator 365 may facilitate interaction between the server 350, any subunit of the server 350, and a high volume (e.g., multiple) of users, inputs, imaging sources, etc. As such, computing resources of the server 350 utilized by any one or a combination of the processor 310, the memory 380, the I/O 390, the communication center 395, and any subunit of these units, such as processing power, data storage space, network bandwidth, and the like may be in high demand at various times during operation. Accordingly, the resource allocator 365 may be configured to manage the allocation of various computing resources as they are required by particular units or particular subunits of the server 350.

The resource allocator 365 may include sensors and/or other specially-purposed hardware for monitoring performance of each unit and/or subunit of the server 350, as well as hardware for responding to the computing resource needs of each unit or subunit. The resource allocator 365 may utilize computing resources of a second computing environment separate and distinct from the server 350 to facilitate a desired operation.

Factors affecting the allocation of computing resources by the resource allocator 365 may include the number of ongoing connections and/or other communication channel connections, a duration during which computing resources are required by one or more elements of the server 350, and/or the like. Computing resources may be allocated to and/or distributed amongst a plurality of second computing environments included in the server 350 based on one or more factors mentioned above. The allocation of computing resources of the resource allocator 365 may include one or more resource allocators 365 flipping a switch, adjusting processing power, adjusting memory size, partitioning a memory element, transmitting data, controlling one or more input and/or output devices, modifying various communication protocols, and the like. The resource allocator 365 may facilitate utilization of parallel processing techniques such as dedicating a plurality of GPUs included in the processor 310 for processing high-quality analysis and manipulation of images and/or videos.

The memory 380 may be utilized for one or any combination of storing, recalling, receiving, transmitting, and/or accessing various files and/or information during operation of the server 350. For example, the memory 380 may be utilized for storing images and/or videos associated with systems and methods of initiating adjustment of an operation associated with an underwater drilling system. The memory 380 may additionally be used for storing, recalling, and/or updating user or drilling system information and the like. The memory 380 may include various types of data storage media such as solid state storage media, hard disk storage media, and any other type of data storage medium which may be known to a person of ordinary skill in the art. The memory 380 may include dedicated hardware elements such as hard drives and/or servers, as well as software elements such as cloud-based storage drives. For example, the memory unit 380 may include various subunits such as an operating system unit 381, an application data unit 382, an application programming interface (API) unit 383, a profile storage unit 384, a content storage unit 385, a video storage unit 386, a secure enclave 387, and/or a cache storage unit 388.

The memory 380 and any of its subunits described here may include any one or any combination of random access memory (RAM), read only memory (ROM), and various forms of secondary storage. RAM may be used to store volatile data and/or to store instructions that may be executed by the processor 310. For example, the data stored may be any one or a combination of a command, a current operating state of the server 350, an intended operating state of the server 350, and the like. As a further example, data stored in the memory 380 may include instructions related to various methods and/or functionalities described here. ROM may be a non-volatile memory device that may have a smaller memory capacity than the memory capacity of a secondary storage. ROM may be used to store instructions and/or data that may be read during execution of computer instructions. Access to both RAM and ROM may be faster than access to secondary storage. Secondary storage may include one or more disk drives and/or tape drives and may be used for non-volatile storage of data or as an over-flow data storage device if RAM is not large enough to hold all working data. Secondary storage may be used to store programs that may be loaded into RAM when such programs are selected for execution. The memory 380 may include one or more databases for storing any data described here. Additionally or alternatively, one or more secondary databases located remotely from the server 350 may be utilized and/or accessed by the memory 380.

The operating system unit 381 may facilitate deployment, storage, access, execution, and/or utilization of an operating system utilized by the server 350 and/or any other computing environment described herein. The operating system may include various hardware and/or software elements that serve as a structural framework for enabling the processor 310 to execute various operations such as the analysis of images, generation of data and/or parameters, e.g., a first parameter, a second parameter, etc., controlling a user interface, etc. The operating system unit 381 may further store various pieces of information and/or data associated with operation of the operating system and/or the server 350 as a whole, such as a status of computing resources (e.g., processing power, memory availability, resource utilization, and/or the like), runtime information, modules to direct execution of operations described herein, user permissions, security credentials, and the like.

The application data unit 382 may facilitate deployment, storage, access, execution, and/or utilization of an application utilized by the server 550 or any other computing environment described herein. For example, it may be desirable for a user to download, access, and/or otherwise utilize a software application on a user device such as a smartphone or other internet-enabled device in order to monitor any one or more of the various operations described herein to be performed. As such, the application data unit 382 may store any information and/or data associated with the application which may allow the application and/or user device to monitor, initiate, or otherwise access the methods and systems associated with initiating adjustment of an operation associated with an underwater drilling system. As such, information included in the application data unit 382 may enable a user to execute various operations described here. The application data unit 382 may further store various pieces of information and/or data associated with operation of the application and/or the server 350 as a whole, such as a status of computing resources (e.g., processing power, memory availability, resource utilization, and/or the like), runtime information, modules to direct execution of operations described herein, user permissions, security credentials, and the like.

The application programming interface (API) unit 383 may facilitate deployment, storage, access, execution, and/or utilization of information associated with APIs of the server 350 and/or any other computing environment described herein (e.g., a user device, system component, etc.). For example, server 350 may include one or more APIs for enabling various devices, applications, and/or computing environments to communicate with the server 350, multiple other servers, databases, or other user devices. Accordingly, the API unit 383 may include API databases containing information that may be accessed and/or utilized by applications and/or operating systems of other devices, components, and/or computing environments associated with initiating adjustment of an operation associated with an underwater drilling system. An API may direct communications between any component of the underwater drilling system and the server 550. Each API database may be associated with a customized physical circuit included in the memory unit 380 and/or the API unit 383. Additionally, each API database may be public and/or private, and so authentication credentials may be required to access information in an API database.

The profile storage unit 384 may facilitate deployment, storage, access, and/or utilization of information associated with any user profiles of any system user by the server 350 and any other computing environment described here (e.g., a user device, system components, etc.). For example, the profile storage unit 384 may store one or more of a user's contact information, authentication credentials, user preferences, user history, personal information, and metadata. The profile storage unit 384 may store any images associated with a particular or group of users and/or underwater drilling systems for analysis, etc. The profile storage unit 384 may communicate with the profile management unit 361 to receive and/or transmit information associated with a user's profile.

The content storage unit 385 may facilitate deployment, storage, access, and/or utilization of information associated with requested content by the server 350 and/or any other computing environment described here. For example, the content storage unit 385 may store one or more of images, text, analytical data, historical data, metadata, etc. to be utilized during operations described herein. The content storage unit 385 may communicate with the content management unit 362 to receive and/or transmit content files.

The media storage unit 386 may facilitate one or more of deployment, storage, access, analysis, and utilization of media content by the server 350 and any other computing environment described herein. Media content may be images, videos, audio files, and any other form of communicative media. For example, the media storage unit 386 may store one or more underwater images which may be utilized in association with initiating adjustment of an operation associated with an underwater drilling system. Further, the media storage unit 386 may store one or more images which have been manipulated by any unit or subunit of a server 350 or other component of an underwater system. For example, the media storage unit 386 may store underwater images of an underwater drilling system. Media content generated or used in performing any of the methods disclosed here may be stored in the media storage unit 386 so that the media content may be analyzed by various components of the server 350 both in real time and at a time after receipt of the media content. The media storage unit 386 may communicate with the GPUs 364 to facilitate any of the processes described here. Media content may include audio, images, text, video feeds, analytical results, graphical representations of results and/or analyses, and/or any other media content associated with systems and methods of initiating adjustment of an operation associated with an underwater drilling system.

The secure enclave 387 may facilitate secure storage of data. The secure enclave 387 may include a partitioned portion of storage media included in the memory unit 380 that is protected by various security measures. For example, the secure enclave 387 may be hardware secured. The secure enclave 387 may include one or more firewalls, encryption mechanisms, and/or other security-based protocols. Authentication credentials may be required prior to providing access to data stored within the secure enclave 387. The secure enclave 387 may store sensitive information associated with systems and methods of initiating adjustment of an operation associated with an underwater drilling system.

The cache storage unit 388 may facilitate short-term deployment, storage, access, analysis, and/or utilization of data. The cache storage unit 388 may serve as a short-term storage location for data so that the data stored in the cache storage unit 388 may be accessed quickly. The cache storage unit 388 may include RAM and/or other storage media types that enable quick recall of stored data. The cache storage unit 388 may include a partitioned portion of storage media included in the memory 380. The cache storage unit 388 may store data associated with initiating adjustment of an operation associated with an underwater drilling system, computational instructions for analysis of images associated with initiating adjustment of an operation associated with an underwater drilling system, or other data which may be frequently used in any of the processes, method, etc., associated with initiating adjustment of an operation associated with an underwater drilling system.

The I/O unit 390 may include hardware and/or software elements for enabling the server 350 to receive, transmit, and/or present information. For example, elements of the I/O unit 390 may be used to receive input from a component of an underwater drilling system, e.g., an image source, a data source, etc., present manipulated images or manipulated video of one or more components of an underwater drilling system, e.g., a reference object, an underwater cloud, etc., and the like. In this manner, the I/O unit 390 may enable the server 350 to interface with a human user in a manner such that, where appropriate, the user may use the methods described here. As described, the I/O unit 390 may include subunits such as one or a combination of an I/O device 391, I/O calibration unit 392, and/or video driver 393.

The I/O device 390 may facilitate any one or any combination of the receipt, transmission, processing, presentation, display, input, and output of information as a result of executed processes described here. The I/O device 390 may include a plurality of I/O devices. The I/O device 390 may include one or more elements of any one or a combination of a component of an underwater system, a computing system, a server 350, and a similar device.

The I/O device 391 may include a variety of elements that enable a user or a component of an underwater drilling system to interface with the server 350. For example, the I/O device 391 may include a keyboard, a touchscreen, a button, a sensor, a biometric scanner, a laser, a microphone, a camera, an internet-enabled device, and/or another element for receiving and/or collecting input from a user or from a component of an underwater drilling system. Additionally and/or alternatively, the I/O device 391 may include a display, a screen, a sensor, a vibration mechanism, a light emitting diode (LED), a speaker, a radio frequency identification (RFID) scanner, and/or another element for presenting and/or otherwise outputting data to a user or to a component of an underwater drilling system, including a means to send instructions to any one or more components which may be associated with an operation associated with initiating adjustment of an operation associated with an underwater drilling system. The I/O device 391 may communicate with one or more elements of the processor 310 and/or the memory unit 380 to execute operations described herein. For example, the I/O device 391 may include a display, which may utilize the GPU 564 to present media content stored in the media storage unit 586 to a user of a user device 120, including but not limited to previous images and/or videos.

The I/O calibration unit 392 may facilitate the calibration of the I/O device 511. For example, the I/O calibration unit 392 may detect and/or determine one or more settings of the I/O device 391, and then adjust and/or modify settings so that the I/O device 391 may operate more efficiently. For example, the I/O calibration unit may determine the suitability of a captured image of an underwater drilling system for further analysis. The I/O calibration unit 392 may utilize a media driver 393 (or multiple media drivers) to calibrate the I/O device 391. The calibration unit 392 may also be operable to determine the ambient level of lighting, levels of contrast, etc., so as to provide a baseline for later image comparisons. The media driver 393 may be installed on a user device so that the user device may recognize and/or integrate with the I/O device 391, thereby enabling media content to be displayed, received, generated, and the like. The I/O device 391 may be calibrated by the I/O calibration unit 392 by based on information included in the media driver 393.

The communication center 395 may facilitate establishment, maintenance, monitoring, and/or termination of communications between the server 350 and other components of an underwater drilling system, other computing environments, third party server systems, and the like. The communication center 395 may further enable communication between various elements (e.g., units and/or subunits) of the server 350 as needed to carry out any one or more of the functions associated with systems and methods of initiating adjustment of an operation associated with an underwater drilling system. The communication center 395 may include a network protocol unit 396, an API gateway 397, an encryption engine 398, and/or a communication device 399. The communication center 395 may include hardware and/or software elements.

The network protocol unit 396 may facilitate establishment, maintenance, and/or termination of a communication connection between the server 350 and any other component of an underwater drilling system and/or another device by way of a network. For example, the network protocol unit 396 may detect and/or define a communication protocol required by a particular network and/or network type. Communication protocols utilized by the network protocol unit 348 may include Wi-Fi protocols, Li-Fi protocols, cellular data network protocols, Bluetooth® protocols, WiMAX protocols, Ethernet protocols, power line communication (PLC) protocols, and the like. Facilitation of communication between the server 350 and any other component of an underwater drilling system and/or other device, as well as any element internal to the server 350, may include transforming and/or translating data from being compatible with a first communication protocol to being compatible with a second communication protocol. The network protocol unit 396 may determine and/or monitor an amount of data traffic to consequently determine which particular network protocol is to be used for establishing a connection with a component of an underwater drilling system, device, transmitting data, and/or performing other operations described herein.

The API gateway 397 may facilitate the enablement of other devices and/or computing environments to access the API unit 383 of the memory 380 of the server 350. For example, a user device may access the API unit 383 via the API gateway 397. The API gateway 397 may be required to validate user credentials associated with a user prior to providing access to the API unit 383 to the user. The API gateway 397 may include instructions for enabling the server 350 to communicate with another device.

The encryption engine 398 may facilitate any one or any combination of translation, encryption, encoding, decryption, and decoding of information received, transmitted, and/or stored by the server 350. For example, the encryption engine 398 may encrypt data associated with a component of an underwater drilling system, historical and/or analytical data, images, etc. Using the encryption engine, each transmission of data may be encrypted, encoded, and/or translated for security reasons, and any received data may be encrypted, encoded, and/or translated prior to its processing and/or storage. The encryption engine 398 may generate any one or combination of an encryption key, an encoding key, a translation key, and the like, which may be transmitted along with any data content.

The communication device 399 may include a variety of hardware and/or software specifically purposed to enable communication between the server 350 and another component of an underwater drilling system and/or other device, as well as communication between elements of the server 350. The communication device 399 may include one or more radio transceivers, chips, analog front end (AFE) units, antennas, processors, memory, other logic, and/or other components to implement communication protocols (wired or wireless) and related functionality for facilitating communication between the server 350 and any other device and/or component. Additionally and/or alternatively, the communication device 399 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

As used herein, the term "signal" may refer to a single signal or multiple signals. The term "signals" may refer to a single signal or multiple signals. Any reference to a signal may be a reference to an attribute of the signal.

Any transmission, reception, connection, or communication may occur using any short-range (e.g., Bluetooth, Bluetooth Low Energy, near field communication, Wi-Fi Direct, etc.) or long-range communication mechanism (e.g., Wi-Fi, cellular, etc.). Additionally or alternatively, any transmission, reception, connection, or communication may occur using wired technologies. Any transmission, reception, or communication may occur directly between systems or indirectly via one or more systems such as servers.

The present disclosure provides several important technical advantages that will be readily apparent to one skilled in the art from the figures, descriptions, and claims. Moreover, while specific advantages have been enumerated above, various embodiments may include all, some, or none of the enumerated advantages. Any sentence or statement in this disclosure may be associated with one or more embodiments.

While various embodiments in accordance with the disclosed principles have been described above, it should be understood that they have been presented by way of example only, and are not limiting. Furthermore, any reference in this disclosure to "invention" in the singular should not be used to argue that there is only a single point of novelty in this disclosure. Multiple inventions may be set forth herein.

We claim:

1. A method of initiating adjustment of an operation associated with an underwater drilling system, the method comprising:
   executing a drilling operation comprising drilling an underwater borehole;
   receiving, using one or more computing device processors, at least one underwater image;
   identifying, using the one or more computing device processors, a reference object in the at least one underwater image, wherein a position of the reference object is fixed relative to the underwater borehole;
   determining, using the one or more computing device processors, a first parameter associated with the reference object;
   identifying, using the one or more computing device processors, an underwater cloud, which is being expelled from the underwater borehole, in the at least one underwater image;
   determining, using the one or more computing device processors, a second parameter associated with the underwater cloud;
   adjusting, using the one or more computing device processors, the second parameter associated with the underwater cloud based on the first parameter associated with the reference object; and
   initiating, using one or more computing device processors, an adjustment of the operation associated with the underwater drilling system based on the adjusted second parameter associated with the underwater cloud.

2. The method of claim 1, wherein identifying, using the one or more computing device processors, the underwater cloud in the at least one underwater image further comprises performing a thresholding operation on the underwater image.

3. The method of claim 2, wherein performing the thresholding operation on the underwater image further comprises separating the underwater image into a first part of the underwater image and a second part of the underwater image, and wherein the first part of the underwater image comprises the underwater cloud.

4. The method of claim 2, wherein separating the underwater image comprises classifying, based on a threshold, the first part of the underwater image and the second part of the underwater image.

5. The method of claim 2, wherein preprocessing the underwater image before performing said thresholding operation, comprising one or more of:
   cropping the underwater image;
   applying contrast enhancement to the underwater image; and
   transforming the underwater image into a second underwater image.

6. The method of claim 1, further comprising determining one or more operation parameters associated with the underwater drilling system based on the adjusted second parameter associated with the underwater cloud.

7. The method of claim 6, wherein the one or more operation parameters comprises one or more of flow rate, standpipe pressure, mud weight, surface-measured pipe movement, and surface-measured pipe position, and downhole annulus pressure.

8. The method of claim 6, further comprising generating a log of the one or more operation parameters as a function of time.

9. The method of claim 6, further comprising synchronizing the one or more operation parameters with one or more additional operation parameters to generate a synchronized log of operation parameters, wherein the one or more operation parameters comprise one or more of flow rate, standpipe pressure, mud weight, surface-measured pipe movement, and surface-measured pipe position, and downhole annulus pressure, and wherein the one or more additional operation parameters comprise one or more of flow rate, standpipe pressure, mud weight, surface-measured pipe movement, and surface-measured pipe position, and downhole annulus pressure, and wherein the synchronized log of operation parameters comprises one or more of virtual flow severity, relative clump size, flow rate, standpipe pressure, and annulus pressure.

10. The method according to claim 1, wherein the adjusted second parameter provides an indication of at least one of a size, a length, a width, a height, a volume, or a rate of change of at least one of the size, the length, the width, the height, or the volume of the underwater cloud.

11. The method according to claim 1, wherein the one or more computing device processors are located in one or more computing systems comprised in at least one of an image-capturing system, a remote operating vehicle, the underwater drilling system, an underwater computing system, the reference object, the underwater borehole, or a remote computing system located remotely from the image-capturing system, the remote operating vehicle, the underwater drilling system, the underwater computing system, the reference object, or the underwater borehole.

12. The method according to claim 1, wherein adjusting the second parameter comprises scaling the second parameter.

13. The method according to claim 1, wherein the image is captured by an image-capturing system.

14. The method according to claim 1, wherein the reference object comprises one or more of a drill pipe a wellhead, and a cylinder base.

15. The method of claim 1, wherein the first parameter comprises at least one of a height, a width, a depth, an orientation, or the position of the reference object.

16. The method of claim 1, wherein the second parameter comprises at least one of a height, a width, a depth, an orientation, or the position of the underwater cloud.

17. A computing system for outputting one or more operation parameters associated with an underwater drilling system, the computing system comprising:
at least one memory comprising instructions; and
one or more computing device processors for executing the instructions, wherein the instructions comprising:
instructions for receiving at least one underwater image;
instructions for identifying, using the one or more computing device processors, a reference object in the at least one underwater image, wherein a position of the reference object is fixed relative to the underwater borehole;
instructions for determining a first parameter associated with the reference object;
instructions for identifying, in the at least one underwater image, an underwater cloud which is being expelled from the underwater borehole;
instructions for determining a second parameter associated with the underwater cloud;
instructions for adjusting the second parameter associated with the underwater cloud based on the first parameter associated with the reference object;
instructions for determining the one or more operation parameters associated with the underwater drilling system based on the adjusted second parameter associated with the underwater cloud; and
instructions for outputting the one or more operation parameters.

18. The computing system of claim 17, wherein the instructions further comprising instructions for enhancing or augmenting of the underwater image.

19. The computing system of claim 17, wherein the one or more computing device processors are comprised in the computing system or located in one or more external computing systems.

20. A non-transitory computer-readable medium including instructions for initiating an adjustment of the operation associated with the underwater drilling system, the instructions comprising:
instructions for receiving at least one underwater image;
instructions for identifying, using the one or more computing device processors, a reference object in the at least one underwater image, wherein a position of the reference object is fixed relative to the underwater borehole;
instructions for determining a first parameter associated with the reference object;
instructions for identifying, in the at least one underwater image, an underwater cloud which is being expelled from the underwater borehole;
instructions for determining a second parameter associated with the underwater cloud;
instructions for adjusting the second parameter associated with the underwater cloud based on the first parameter associated with the reference object; and
instructions for initiating an adjustment of the operation associated with the underwater drilling system based on the adjusted second parameter associated with the underwater cloud.

* * * * *